(12) United States Patent
Desjardins (10) Patent No.: US 10,270,704 B2
(45) Date of Patent: Apr. 23, 2019

(54) THROTTLING OUTPUT WITH ONGOING INPUT

(71) Applicant: Microsoft Technology Licensing, LLC, Redmond, WA (US)

(72) Inventor: Patrick Desjardins, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 317 days.

(21) Appl. No.: 15/347,950

(22) Filed: Nov. 10, 2016

(65) Prior Publication Data

US 2018/0131626 A1    May 10, 2018

(51) Int. Cl.
| | |
|---|---|
| *G06F 15/173* | (2006.01) |
| *H04L 12/875* | (2013.01) |
| *H04L 12/861* | (2013.01) |
| *H04L 29/06* | (2006.01) |

(52) U.S. Cl.
CPC ........ *H04L 47/566* (2013.01); *H04L 49/9063* (2013.01); *H04L 63/1458* (2013.01)

(58) Field of Classification Search
USPC ....... 709/203, 206, 217, 219, 223, 224, 226, 709/228, 230, 232, 238; 370/310, 394, 370/412; 455/427; 1/1
See application file for complete search history.

(56) References Cited

U.S. PATENT DOCUMENTS

| | | | |
|---|---|---|---|
| 6,721,334 B1 | 4/2004 | Ketcham | |
| 7,089,320 B1 | 8/2006 | Biederman et al. | |
| 7,170,893 B2 | 1/2007 | Rajan et al. | |
| 7,274,711 B2 | 9/2007 | Kajizaki et al. | |
| 7,324,522 B2* | 1/2008 | Rosengard | H04L 47/13 370/412 |
| 7,391,769 B2 | 6/2008 | Rajkumar et al. | |
| 7,526,593 B2 | 4/2009 | Mandal et al. | |
| 7,613,115 B2 | 11/2009 | Carmeli et al. | |
| 7,684,425 B2* | 3/2010 | Thesling | H04B 7/18543 370/394 |
| 7,689,162 B2* | 3/2010 | Thesling | H04B 7/18543 455/427 |
| 7,873,061 B2 | 1/2011 | Gast et al. | |
| 8,559,306 B2 | 10/2013 | Gong et al. | |
| 8,879,571 B2 | 11/2014 | Ziegler | |
| 8,966,000 B2 | 2/2015 | Ganapathy et al. | |
| 10,074,115 B1* | 9/2018 | Hynoski | G06Q 30/04 |
| 2005/0063402 A1* | 3/2005 | Rosengard | H04L 47/13 370/412 |

(Continued)

FOREIGN PATENT DOCUMENTS

EP    2685392 A1    1/2014

OTHER PUBLICATIONS

"Throttling Pattern", Published on: Mar. 10, 2014 Available at: https://msdn.microsoft.com/en-us/library/dn589798.aspx.

*Primary Examiner* — Quang N Nguyen (57) ABSTRACT

A plurality of communications sent from a sending program can be stored in a queue for the duration of a time period specified by a timer. When the timer expires, a specified program module can be executed that merges the plurality of communications into a single result. The singe result can be sent to a receiving program. Incoming communications are not throttled or delayed.

13 Claims, 6 Drawing Sheets

(56) References Cited

U.S. PATENT DOCUMENTS

2010/0142421 A1* 6/2010 Schlicht ................. H04W 4/20
                                                     370/310
2016/0088588 A1  3/2016 Uusitalo et al.
2018/0182193 A1* 6/2018 Spittle ................. G06Q 20/105

* cited by examiner

```
/**
 * Add payload to a queue for a specified time before a method is called on the queue.
 *
 * Multiple payloads can be added. Get method to merge them into 1 call to a potentially expensive operation.
 *
 * Send 1 payload instead of multiple which can occur when dragging (horizontal + vertical movement).
 */
class DelayedQueue<T> {        ─── 222
    /**
     * The queue of T that is added when called, and removed when the method is invoked
     */
    private _queue: T[];

/**
     * Number of millisecond to wait before invoking the method on queued payloads
     */
    private _delayMillisecond: number;    ─── 224

/**
     * Method to call when the timer triggered sending of all the payloads
     * @param {T[]} queueData - List of T (payload)
     */
    private _method: (queueData: T[]) => void;    ─── 226

/**
     * Timer instance
     */
    private _timerId: number;    ─── 228

/**
     * Create a new DelayedQueue that specifies method to be called when the timer expires.
     * @param {Method} method - Method to be called with the queued payload
     * @param {number} delayMillisecond - Delay before calling the method.
     */
    constructor(method: (queueData: T[]) => void, delayMillisecond: number = 50) {
        this._delayMillisecond = delayMillisecond;
        this._method = method;
        this._queue = [];
    }

/**
     * Add a payload to the queue
     * @param {T} payloadToQueue - Payload to add in the queue
     */
    public add(payloadToQueue: T): void {
        this._queue.push(payloadToQueue);           230
        this._startTimer();
    }

/**
     * Start a timer one does not exist. This is done when adding an element to the queue
     * if a timer did not start yet
     */
    private _startTimer(): void {
        if (!this._timerId) {
            this._timerId = window.setTimeout(() => {
                var copy = this._queue.slice();
                this._method(copy);                     232
                this._queue = [];
                window.clearTimeout(this._timerId);
                delete this._timerId;
            }, this._delayMillisecond);
        }
    }
}
```

THROTTLING OUTPUT WITH ONGOING INPUT

BACKGROUND

The load on an application can vary over time based on the number of active users or the type of activities that are being performed. Some operations can be time consuming and can slow down the system when executed in high frequency.

In computing, a throttling process is a process that is intended to regulate the rate at which some aspect of application processing proceeds. For example, in online transactional processing, a throttling mechanism may be embedded in the application hosting platform to balance the application's request/response rates to prevent a slowdown or even denial of service scenario because too much input has choked the system.

SUMMARY

The sending of a number of communications can be delayed by caching communication data for a specified time. When the specified delay time period has been reached, the data can be processed so that one result is generated from the multiple communications. A single communication can be generated that includes the result generated from the payloads of the multiple communications. As used herein the "payload" refers to the part of a communication that is the data that is processed, analyzed, merged, aggregated, etc., excluding headers, metadata or any other information included in the communication. A number of payloads can be added to a queue for a specified time. A timer may be set for the specified time. When the specified time has been reached and the timer expires, the data in the queue can be processed. Processing the data can reduce multiple communications to a single communication, so that a single result representing the effect of all the data in the queue can be sent. That is, the data in the queue can be processed to yield a single cumulative or otherwise merged, aggregated or processed result which is representative of all the communications processed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 2b illustrates an example of a script 220 for throttling communications with ongoing input in accordance with aspects of the subject matter described herein.

DETAILED DESCRIPTION

Overview

Some operations can be time consuming and can slow down response time when executed in high frequency. For example, in a network, certain operations occurring on a client computer can result in sending hundreds of requests to a server within a short period of time (e.g., hundreds of requests/second). This can cause a processing slowdown or worse. In accordance with aspects of the subject matter described herein, the sending of a number of communications across a network can be delayed by caching communication data for a specified time. Meanwhile, incoming communications proceed unchecked. That is, incoming communications are not throttled or delayed. When the specified delay time period has been reached, (e.g., a timer is set for a specified period of time and the specified period of time has elapsed, also referred to as "the timer has expired") the data can be processed so that one result is generated from a group of communications. For example, all of the data in the queue can result in the generation of a single communication. The single communication can be sent across the network, the single communication including the result generated from the payloads of the multiple communications, thus reducing the number of requests sent to a server significantly (e.g., if 100,000 requests are sent per second and the delay is set to one half second, instead of receiving 100,000 requests per second, 2 requests per second would be received by the server). It will be appreciated that the example provided is meant to be illustrative, not limiting. For example, the queued data may result in the generation of several communications instead of just one, the point being the number of communications that are sent on to a receiver are significantly reduced while incoming communications proceed without interference.

Data from the communication can be placed in a queue. Periodically, based on the timer, the data can be aggregated, merged, accumulated, grouped, analyzed, or otherwise processed to produce a result that encapsulates the meaning of the data. The data in the queue can be processed so that multiple communications are reduced to a single communication comprising a single result of all the data in the queue. That is, the data in the queue or a part of the data in the queue can be processed to yield a single cumulative or otherwise merged, aggregated or processed result. In accordance with some aspects of the subject matter described herein, the communications can be user input to a user interface executing on a single computer. In accordance with some aspects of the subject matter described herein, the communications can be messages or events or any type of information sent between applications on a single computer or between multiple computers connected in a network.

Throttling Output with Ongoing Input

Figure 1A:
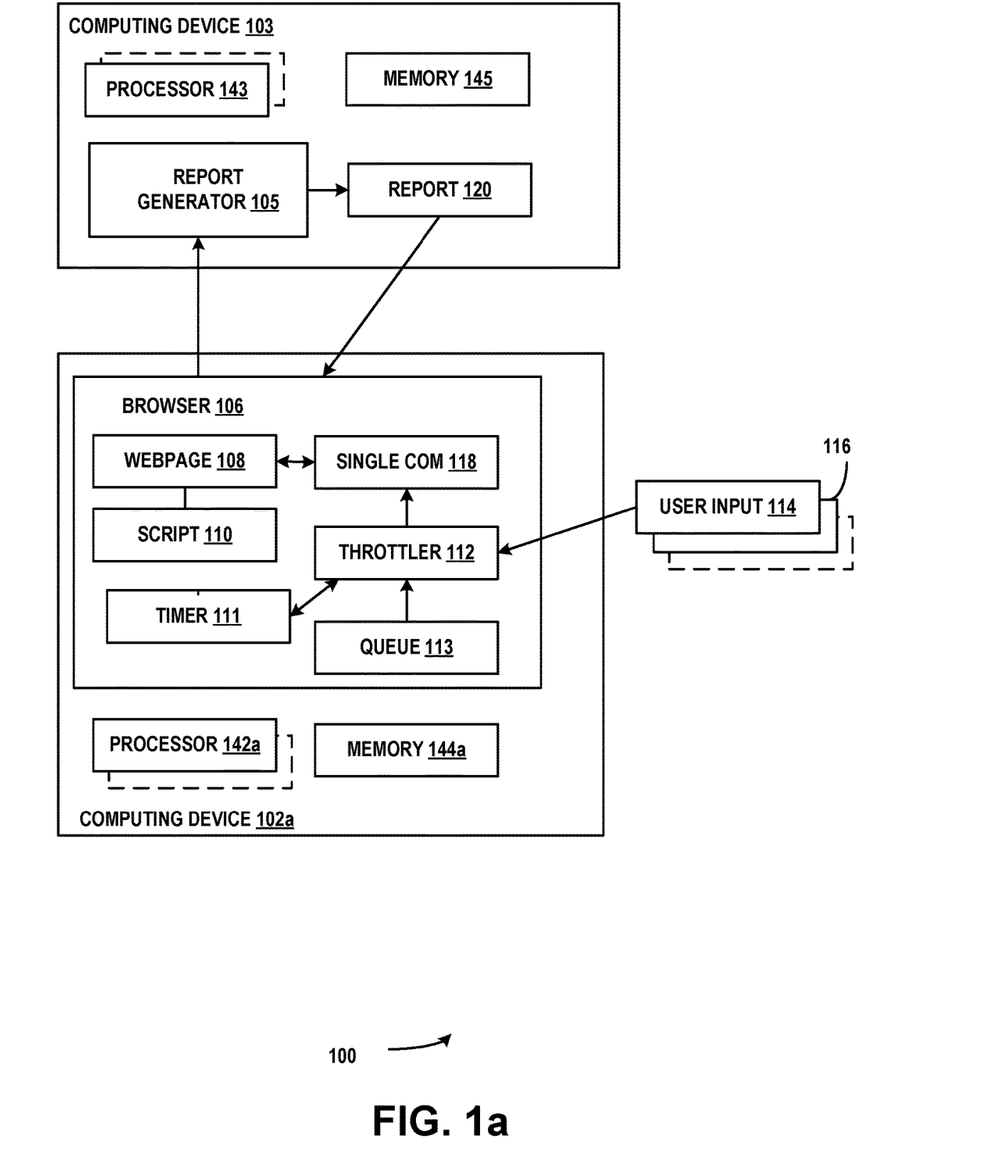
FIG. 1a illustrates a system 100 comprising an example of a system in which communications are throttled with ongoing input in accordance with aspects of the subject matter described herein.

FIG. 1a illustrates a system 100 comprising an example of a system in which communications are throttled with ongoing input in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises automated performance debugging system.

System 100 can include one or more computing devices such as, for example, computing device 102a and/or computing device 103. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102a can include one or more processors such as processor 142a, etc., and a memory such as memory 144a that communicates with the one or more processors 142a, etc. A computing device such as computing device 103 can include one or more processors such as processor 143, etc., and a memory such as memory 145 that communicates with the one or more processors. Computing device 103 may be a server computer. Computing device 102a may be a client computer.

System 100 may include one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any combination of any number of the following: an application such as but not limited to a report generator such as report generator 105 that generates one or more reports such as report 120. System 100 may include any one of or any combination of any number of the following: a browser such as browser 106, a webpage such as webpage 108, a script such as script 110, a timer such as timer 111 and or a throttling program module such as throttler 112. Multiple communications may be received by throttler 112, represented in FIG. 1a by user input 114, 116, etc.

Throttler 112 may include one or more program modules (not shown). For example, one or more program modules of throttler 112 may receive one or more communications. One or more program modules of throttler 112 may extract data (e.g., the payload of the communication) from the one or more communications. One or more program modules of throttler 112 may create a queue such as queue 113 in which to store the data. One or more program modules of throttle 112 may queue the data to be processed in queue 113. One or more program modules of throttle 112 may create and/or set a timer such as timer 111 for a delay. One or more program modules of throttle 112 may specify a program module to execute to process the data in the queue. The specified program module may process the data in the queue 113 to generate a single result, e.g., single communication 118. One or more program modules of throttler 112 may process the data in the queue 113 to generate a single result in response to being triggered by the timer 111. Alternatively, processing may proceed whenever a communication is received and only the result can be stored in the queue. The timer 111 may include comparison logic that compares elapsed time against a specified value, so that processing of the data is triggered when the timer value matches the specified value.

One or more program modules of throttler 112 may generate a single communication comprising the single result. One or more program modules of throttler 112 may send the communication to a recipient. User input such as user input 114, 116, etc. may be received. User input 114, 116, etc. may include information such as the amount of time to wait before processing the data in the queue (e.g., specifying the time period of the timer), specifying the program module to call to process the data in the queue, etc. Alternatively, this information can be provided in the script 110. User input such as user input 114, 116, etc. may include the data that is placed in the queue 113 and processed, merged, aggregated, etc. to generate the single communication 118.

For example, a webpage (e.g., webpage 108) can be downloaded from a server such as computing device 103 to a client such as computing device 102a. A script such as script 110 may execute to make the web page interactive without innumerable downloads from the server. Suppose the webpage allows a user to select a time period for which an animated report is generated. Suppose for example, the report displays a timeline on the x axis and work teams on the y axis. Using a click and drag operation to select a point on the timeline within a particular work team on the y axis can result in an animation being generated which redraws the timeline for that team. Suppose that each time the user moves the cursor in a click or click and drag operation, a communication is generated. Hundreds of communications per second, comprising pairs of co-ordinates may be generated, making the browser execution very slow because the browser has to refresh with each communication, redrawing the timeline for each pair of co-ordinates received.

In accordance with aspects of the subject matter described herein, instead of refreshing the browser with each communication, as described above, a timer can be set, the communications can be queued until the timer expires and a single communication representing the end result can be generated. For example, suppose relative cursor co-ordinates of (−1x, 0y) followed by (−2x, 3y) are received. The result is a final move of −3x and 3y. In this example, a single communication with the co-ordinates (−3x, 3y) can be generated representing the point on the timeline for which the animation is generated. The animation generation may occur on the server. Thus instead of hundreds of communications per second being sent to the server, only a few can be sent, (depending on the time period chosen for the timer). It will be appreciated that the subject matter described herein is not limited to the example presented. The example is meant to be illustrative not limiting. It will be appreciated that the data for which the subject matter described herein is applicable includes any data in which the pathway to the combined value is not necessarily of great value. For example, in a stock market scenario rapid changes in stock prices do not have to be kept track of. Only the price of the stock at the moment of purchase is needed.

FIG. 2b illustrates an example of a script 220. Script 220 is written in TypeScript but it will be appreciated that the script could be written in any suitable markup language or programming language. A particular class (e.g., DelayedQueue<T> 222) can be created that on its creation takes a delay (e.g., private_delayMillisecond: number; 224) and a single method (e.g., private_method: (queueDate: T[ ])=>void; 226) as parameters. The class can instantiate an algorithm that processes the queued data. The delay parameter can be used to specify how much time can elapse between receiving a communication and processing and releasing the communication (e.g.; private_timerId: number) 228. The delay can be implemented using a timer. The method parameter can be used to specify the method invoked after the delay has occurred. The invoker of the method can add data to the queue (e.g., code section 230). If it is the first time the method is invoked or if the queue is empty, a timer can be started for the amount of the delay (e.g., code section 232). Meanwhile, any communication data can be queued (e.g., public add(payloadToQueue:T): void{ 230). When the time period specified for the timer has elapsed, the data in the queue can be processed by the specified method to generate a result. A single communication including the computed result can be sent on to the receiver.

Figure 1B:
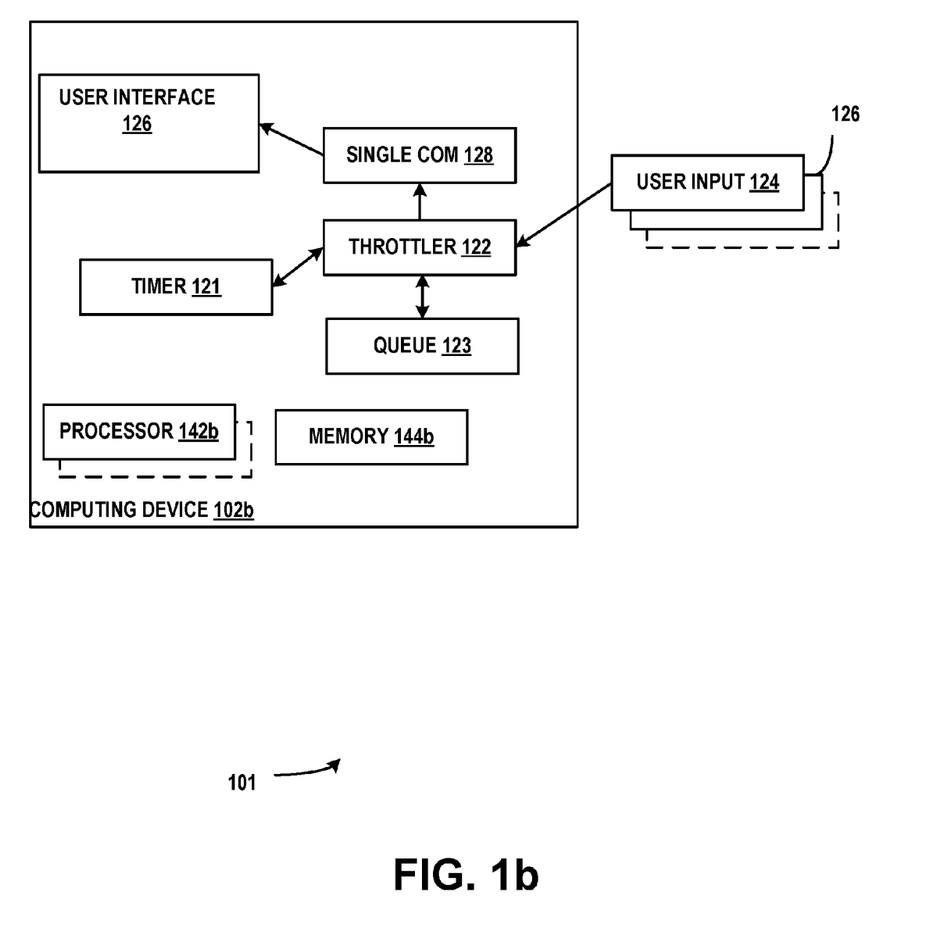
FIG. 1b illustrates a system 101 comprising another example of a system in which communications are throttled with ongoing input in accordance with aspects of the subject matter described herein.

FIG. 1b illustrates a system 101 comprising another example of a system in which communications are throttled with ongoing input in accordance with aspects of the subject matter described herein. All or portions of system 101 may reside on one or more computers or computing devices such as the computers described below with respect to FIG. 3. System 101 or portions thereof may be provided as a stand-alone system or as a plug-in or add-in.

System 101 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

Contemplated computing devices include but are not limited to desktop computers, tablet computers, laptop computers, notebook computers, personal digital assistants, smart phones, cellular telephones, mobile telephones, sensors, server computers and so on. A computing device such as computing device can include one or more processors and a memory that communicates with the one or more processors.

System 101 can include one or more computing devices such as, for example, computing device 102b. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102b can include one or more processors such as processor 142b, etc., and a memory such as memory 144b that communicates with the one or more processors.

System 101 may include one or more program modules that when loaded into the memory and accessed by the one or more processors cause the processor to perform the action or actions attributed to the one or more program modules. The processor(s) may be configured to perform the action or actions attributed to the one or more program modules. System 101 may include any one of or any combination of any number of the following: a user interface such as user interface 126, user input such as user input 124, 126, etc. a timer such as timer 121 and or a throttler such as throttler 122. Multiple communications (e.g., user input 124, 126, etc.) may be received by throttler 122. Throttler 122 may queue the data to be processed in a queue such as queue 123 and set timer 121 for a delay. Throttler 122 may process the data in the queue to generate a single result. When the timer period is reached, a single communication 128 can be generated and sent to user interface 126.

Figure 1C:
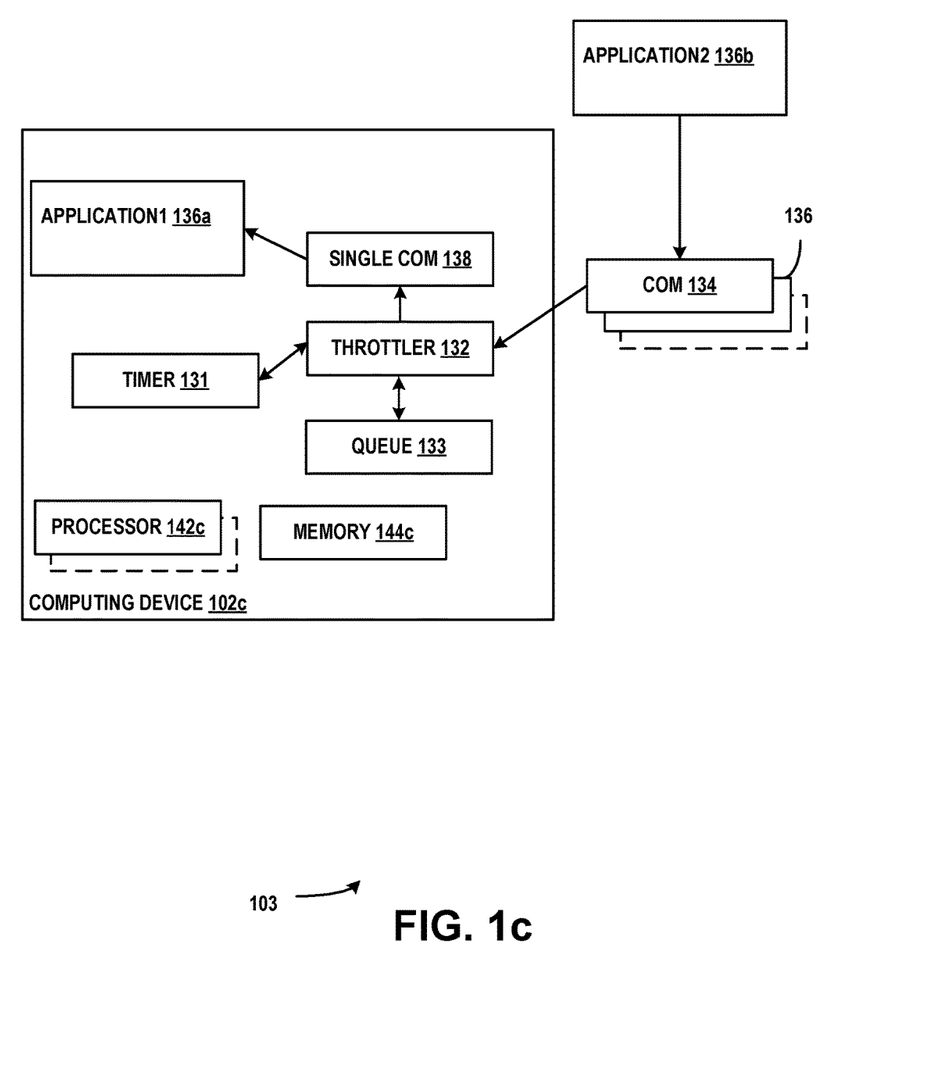
FIG. 1c illustrates a system 103 comprising another example of a system in which communications are throttled with ongoing input in accordance with aspects of the subject matter described herein.

FIG. 1c illustrates a system 103 comprising an example of a system in which communications are throttled with ongoing input in accordance with aspects of the subject matter described herein. All or portions of system 103 may reside on one or more computers or computing devices such as the computers described below with respect to FIG. 3. System 103 or portions thereof may be provided as a stand-alone system or as a plug-in or add-in.

System 103 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

Contemplated computing devices include but are not limited to desktop computers, tablet computers, laptop computers, notebook computers, personal digital assistants, smart phones, cellular telephones, mobile telephones, sensors, server computers and so on. A computing device such as computing device can include one or more processors and a memory that communicates with the one or more processors.

System 103 can include one or more computing devices such as, for example, computing device 102c. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102c can include one or more processors such as processor 142c, etc., and a memory such as memory 144c that communicates with the one or more processors.

System 103 may include one or more program modules that when loaded into the memory and accessed by the one or more processors cause the processor to perform the action or actions attributed to the one or more program modules. The processor(s) may be configured to perform the action or actions attributed to the one or more program modules. System 103 may include any one of or any combination of any number of the following: a first application such as application 1 136a, one or more communications such as communication 134, communication 136, etc. generated by application 2 136b, a timer such as timer 131 and or a throttler such as throttler 132. Multiple communications (e.g., communications 134, 136, etc.) may be received by throttler 132. Throttler 132 may queue the data to be processed in queue 133 and set a timer such as timer 131 for a delay. Throttler 132 may process the data in the queue to generate a single result. When the timer period specified for the timer is reached, a single communication such as single communication 138 can be generated and sent to application 1 136a.

Figure 2A:
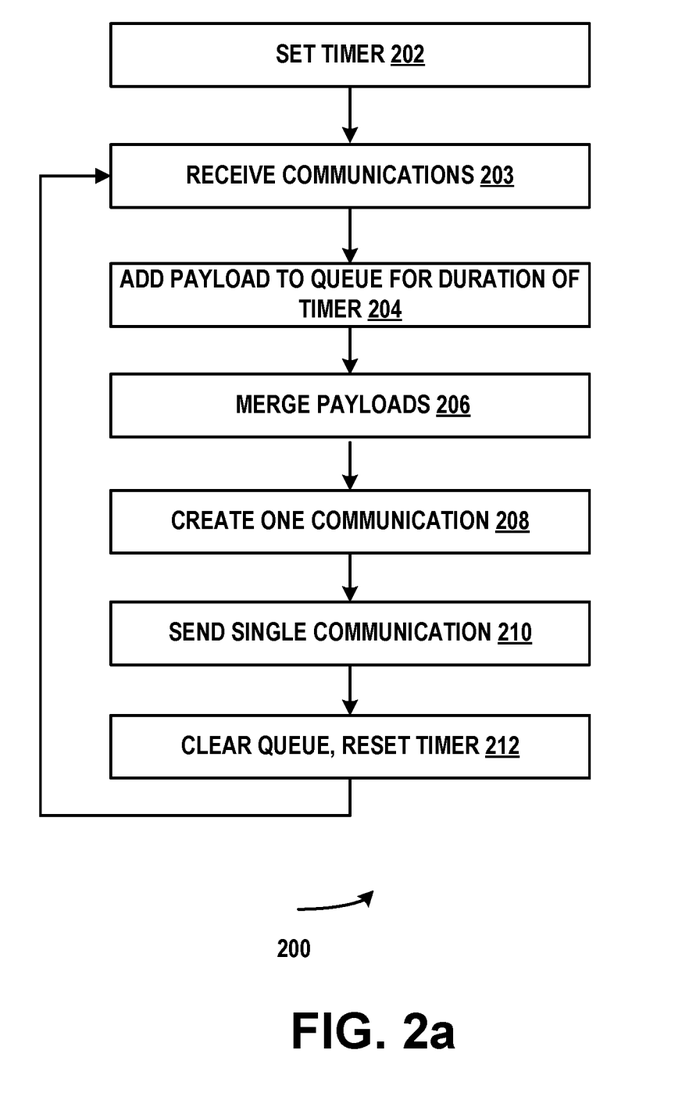
FIG. 2a illustrates an example of a method 200 for throttling communications with ongoing input in accordance with aspects of the subject matter described herein.

FIG. 2a illustrates an example of a method 200 for throttling communications with ongoing input in accordance with aspects of the subject matter disclosed herein. The method described in FIG. 2a can be practiced by a system such as but not limited to the one described with respect to FIG. 1a and/or FIG. 1b and/or FIG. 1c. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 a timer can be set. A queue can be allocated. At operation 203 one or more communications (including but not limited to messages, notifications) can be received. At operation 204 the payload of the communication(s) can be added to the queue until the timer expires. At operation 206 the contents of the queue can be merged to generate a single result. At operation 208 one communication per group of communications can be created, including the generated single result. At operation 210 the single communication can be sent. At operation 212 the queue can be cleared and the timer can be reset. Processing can continue at operation 203.

Described herein is a computing device comprising a processor, a memory connected to the processor; the processor configured to set a timer, create a queue, receive at least one of a plurality of communications, place a payload associated with the at least one communication into the queue until the timer expires and in response to the timer expiring, process the contents of the queue to generate a single result and generate a single communication comprising the single result. A method that processes the contents of the queue can be specified. The at least one communication can be sent from a first application. The single communication comprising the single result can be sent to a second application. The data can be mergeable data. The data can be click and drag data. The second application can be a user interface.

Described herein is a method comprising configuring a processor of a computing device to set a timer, create a queue, receive at least one communication of a plurality of communications from a first application until the timer expires, store a payload of the at least one communication in the queue, in response to the timer expiring, process contents of the queue, generate a single communication having a payload comprising the result of processing contents of the queue and send the single communication to a second application. The first application can be a user interface executing on a client computer. The second application can execute on a server computer. The first application can be rendered by a browser using a script file. The script file can identify a method that merges the content of the queue. The script file can specify the duration of the timer. The script file can identify a method that sends the generated single result.

Described herein is a computing device comprising a processor, a memory connected to the processor; the processor configured to merge until a timer expires payloads associated with communications received from a sending application to generate a single result, the payloads stored in a queue and send a single communication comprising the single result to a receiving application. The queue can be cleared after contents of the queue have been processed. The timer can be reset. A delay parameter can specify how much time can elapse between receiving a communication and releasing the communication. a method parameter can specify the method invoked after a delay has occurred. A method parameter can specify the method invoked to send the communication.

Example of a Suitable Computing Environment

Figure 3:
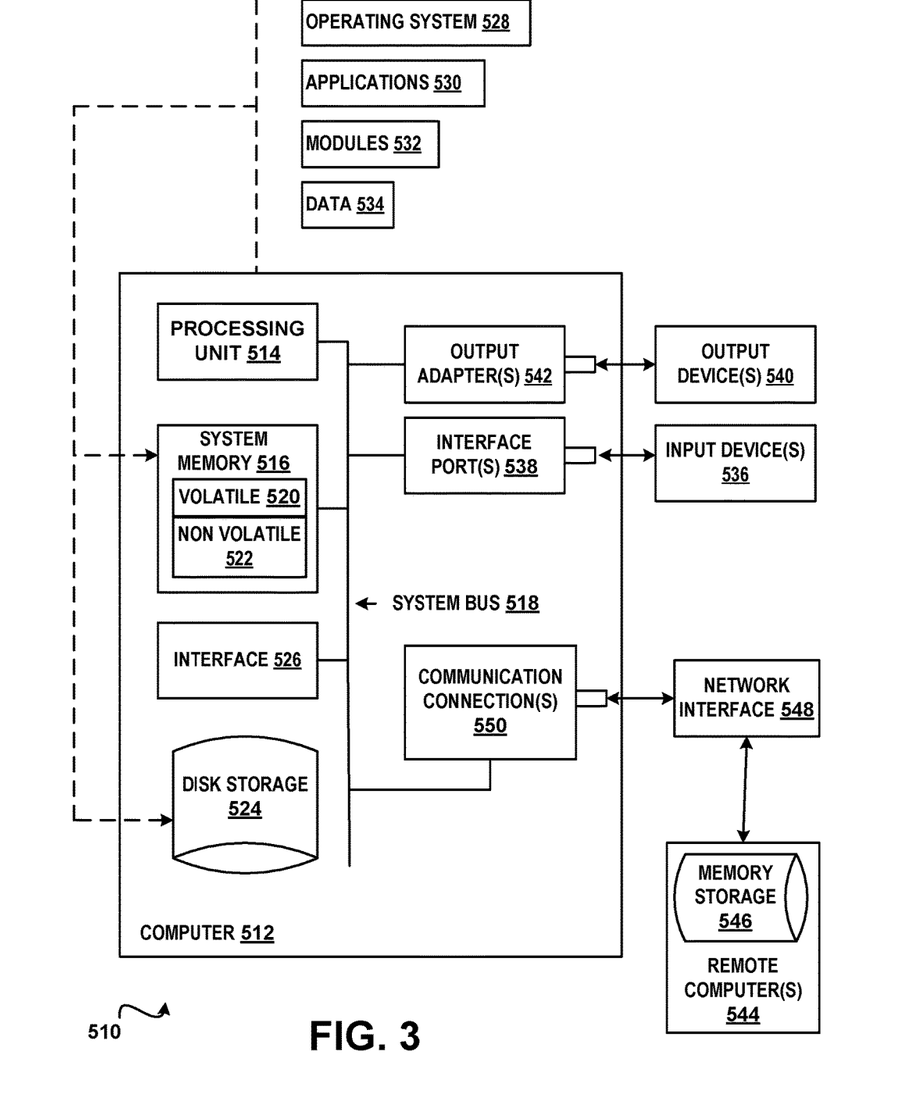
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
   a processor:
   a memory connected to the processor;
   the processor configured to:
   set a timer;
   create a queue;
   receive at least one of a plurality of communications sent from a first application;
   place a payload associated with the at least one communication into the queue until the timer expires;
   in response to the timer expiring, process the contents of the queue to generate a single result; and
   generate and send a single communication comprising the single result to a second application,
   wherein the first application is rendered by a browser using at least a script file that identifies a method that merges the content of the queue.

2. The computing device of claim 1, wherein a method that processes the contents of the queue is specified.

3. The computing device of claim 1, wherein the payload comprises mergeable data.

4. The computing device of claim 1, wherein the payload comprises mergeable data comprising click and drag data.

5. The computing device of claim 1, wherein the first application comprises a user interface.

6. A method comprising configuring a processor of a computing device to:
   set a timer;
   create a queue;

receive at least one communication of a plurality of communications from a first application until the timer expires;

store a payload of the at least one communication in the queue;

in response to the timer expiring, process contents of the queue;

generate a single communication having a payload comprising the result of processing contents of the queue; and send the single communication to a second application, wherein the first application is rendered by a browser using at least a script file that identifies a method that merges the content of the queue.

7. The method of claim 6, wherein the first application is a user interface executing on a client computer.

8. The method of claim 6, wherein the second application executes on a server computer.

9. The method of claim 6, wherein the first application is rendered by a browser using a script file.

10. The method of claim 6, wherein the script file identifies a method that sends the generated single result.

11. A computing device comprising:
a processor;
a memory;
the memory connected to the processor;
the processor configured to:
    merge, until a timer expires, payloads associated with communications received from a sending application to generate a single result, the payloads stored in a queue;
    send a single communication comprising the single result to a receiving application; and
    clear the queue after contents of the queue have been processed and reset the timer,
    wherein a delay parameter specifies how much time can elapse between receiving a communication and releasing the communication.

12. The computing device of claim 11, wherein a method parameter specifies a method invoked after a delay has occurred.

13. The computing device of claim 11, wherein a method parameter specifies a method invoke to send the single communication.

* * * * *